United States Patent [19]
Behling

[11] Patent Number: 5,732,967
[45] Date of Patent: Mar. 31, 1998

[54] SAFETY CHAIN FOR TOWED VEHICLES

[75] Inventor: Andrew G. Behling, N6795 Hwy. A, Lot 41, Lake Mills, Wis. 53551

[73] Assignees: Andrew G. Behling; Susan J. Corcoran, both of Lake Mills, Wis.

[21] Appl. No.: 545,023

[22] Filed: Oct. 19, 1995

[51] Int. Cl.⁶ ........................................ B60D 1/28
[52] U.S. Cl. ........................... 280/457; 280/480; 280/507
[58] Field of Search ........................ 280/457, 480, 280/507, 432

[56] References Cited

U.S. PATENT DOCUMENTS

| | | | |
|---|---|---|---|
| 3,125,355 | 3/1964 | Snuggins | 280/457 |
| 3,132,878 | 5/1964 | De Puydt et al. | 280/457 |
| 3,215,355 | 11/1965 | Snuggins | 280/457 |
| 3,265,407 | 8/1966 | Paddock | 280/457 |
| 3,302,807 | 2/1967 | Blair | 214/42 |
| 3,504,811 | 4/1970 | Wegener et al. | 214/86 |
| 3,549,173 | 12/1970 | Stanfield | 280/457 |
| 3,608,931 | 9/1971 | Skromme | 280/457 |
| 3,740,079 | 6/1973 | Skinner | 280/480 |
| 4,180,281 | 12/1979 | Tertinek | 280/457 |
| 4,266,800 | 5/1981 | Hawkins | 280/491 |
| 4,467,598 | 8/1984 | Wells | 280/457 X |
| 4,768,803 | 9/1988 | Hewitt et al. | 280/462 |
| 4,773,805 | 9/1988 | Krahling | 280/507 X |
| 5,362,084 | 11/1994 | Edwards | 280/457 |

FOREIGN PATENT DOCUMENTS

| | | |
|---|---|---|
| 844861 | 7/1949 | Germany. |
| 891800 | 7/1949 | Germany. |

*Primary Examiner*—Anne Marie Boehler
*Attorney, Agent, or Firm*—Nilles & Nilles, S.C.

[57] ABSTRACT

A safety chain for securing a towed vehicle to a towing vehicle and which has a safety basket for limiting downward movement of a tongue of the towed vehicle relative to a hitch of the towing vehicle to prevent the tongue from contacting the roadway. The chain is attached to at least one of the vehicles by a latch that has a shackle for engagement with a mount of the vehicle and a catch carried by the shackle that can be spring biased toward its latched position and which is movable to a position disposed from its latched position to unlatch the latch. Preferably, the catch can be retained in the latched position by a retainer that engages the catch and shackle. Preferably, to secure the latch to a vehicle to deter theft of the chain, the retainer can be a lock. To secure the safety chain to the tongue to prevent theft of the tongue and preferably the towed vehicle, a securing chain and a locking chain are wrapped around the tongue to prevent withdrawal of the tongue free of the chains.

23 Claims, 3 Drawing Sheets

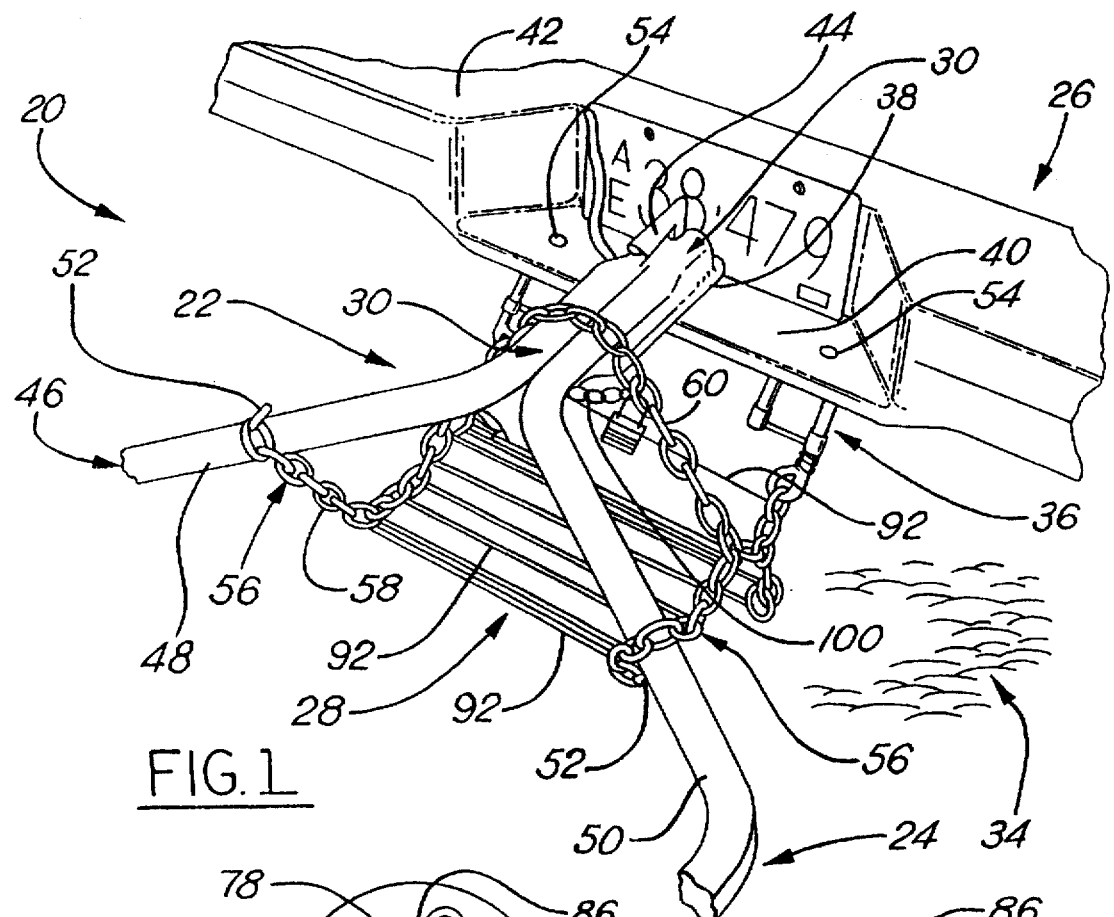
FIG. 1
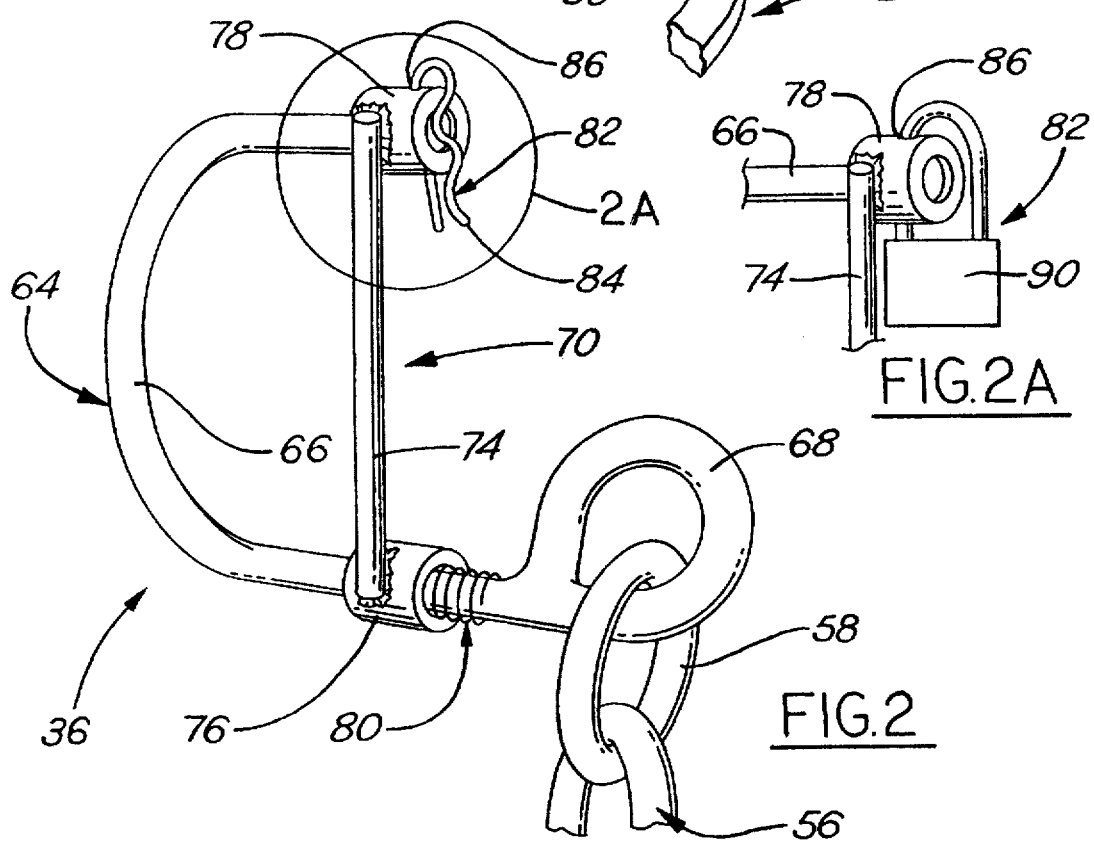
FIG. 2
FIG. 2A

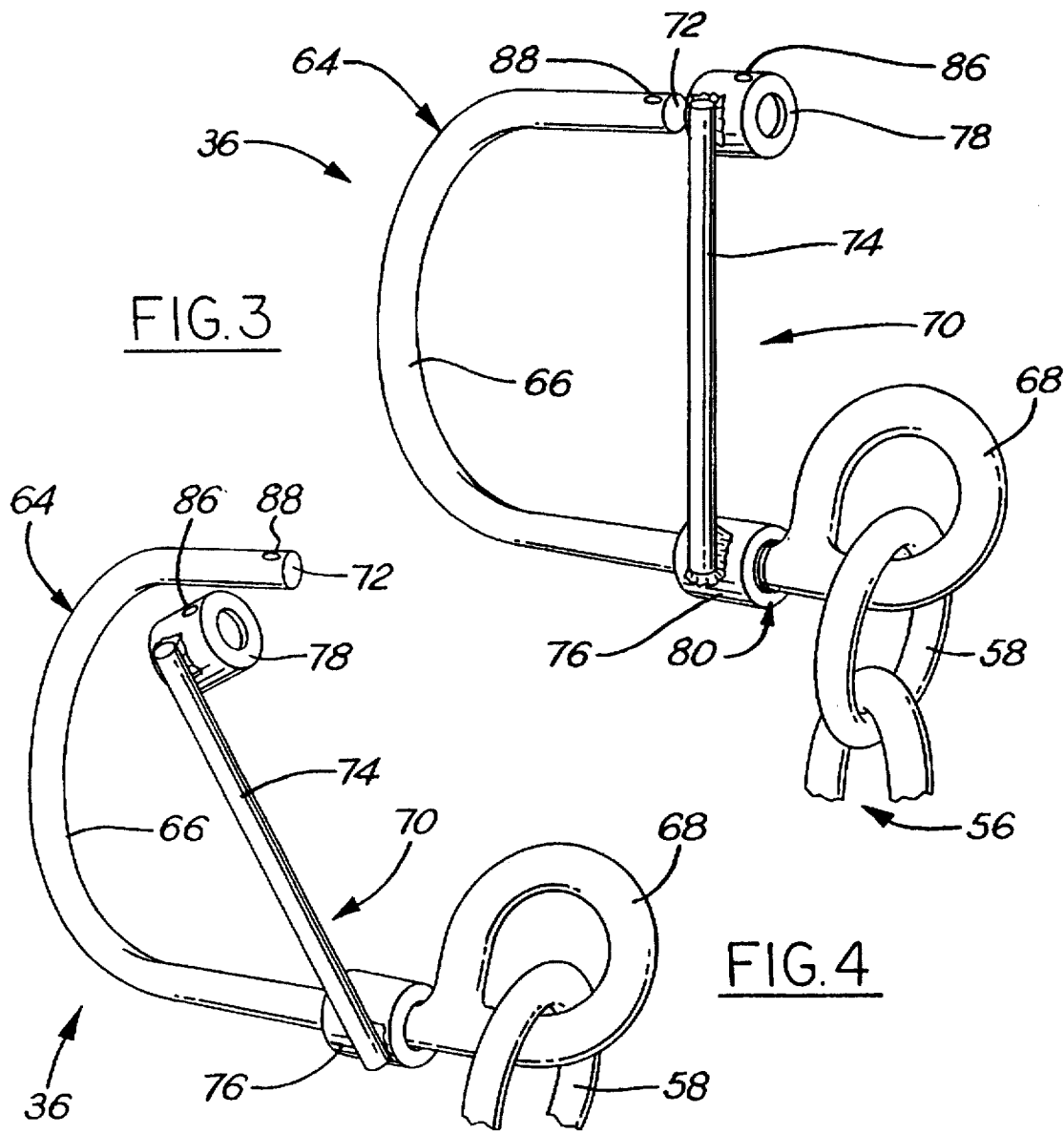
FIG.3
FIG.4
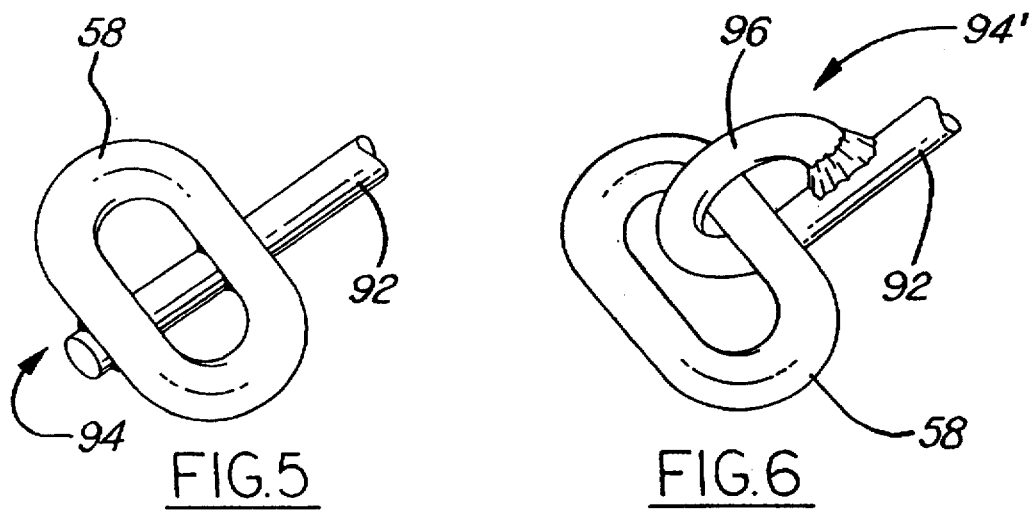
FIG.5
FIG.6

5,732,967

SAFETY CHAIN FOR TOWED VEHICLES

FIELD OF THE INVENTION

This invention relates generally to a safety chain or harness for securing a towed vehicle to a towing vehicle and more particularly to a safety chain which limits downward travel of a tongue of the towed vehicle relative to a mounting hitch of the towing vehicle while enabling the chain to be easily and securely attached and which deters theft.

BACKGROUND OF THE INVENTION

Safety harnesses or safety chains have long been used to secure a towed vehicle, such as a trailer, to a towing vehicle, such as an automobile or a truck. The purpose of these safety devices is to prevent the trailer from completely freeing itself from the towing vehicle should a tongue of the trailer become disengaged from a hitch of the towing vehicle.

To prevent complete disengagement of the trailer from the towing vehicle, a safety chain typically is constructed of a pair of spaced apart chains which are each attached at one end to the trailer and at their other end to the towing vehicle. To enable the vehicle and trailer to turn, the chains are long enough such that they are slack when the trailer tongue is hitched to the towing vehicle. Should the trailer tongue become unhitched during towing, the chains keep the trailer secured to the towing vehicle thereby preventing the trailer from undesirably blocking the path of vehicles following the trailer and also from dangerously moving into the path of oncoming vehicles in the opposite lane of the road.

One such safety chain arrangement is disclosed in Tertinek. U.S. Pat. No. 4,180,281, and uses a chain wrapped through a towing post of a towable plaster, mortar or concrete mixer and which is attached to the towing vehicle. To secure the chain to the towing vehicle, its ends are inserted through a link of the chain and secured by an end link with a snap to prevent withdrawal.

Unfortunately, this and other conventional safety chain arrangements do not significantly limit downward movement of the trailer tongue or towing post, if at all, relative to the hitch and thus do not prevent the tongue or post from coming into contact with the Found or pavement, should the trailer become unhitched. Should a trailer become unhitched and come into contact with the ground or pavement while the towing vehicle is moving, severe damage can occur to the trailer and its cargo, resulting in damage to the towing vehicle while possibly also causing failure of the safety chain.

Additionally, safety chains often use conventional open-ended hooks to attach the chain to either the towing vehicle or the trailer. Unfortunately, these hooks can disengage, possibly causing the safety chain to fail should the trailer become unhitched, allowing the trailer to completely and unsafely separate from the towing vehicle. Moreover, these safety chains are theft prone because they are not designed to be secured and locked to the towing vehicle or the trailer such that they are difficult to remove. In fact, in some instances, these safety chains cannot be easily locked to either the vehicle or trailer unless they are manipulated such that they no longer function as a safety chain.

Finally, conventional safety chains are not heretofore known to prevent theft of the trailer by securely locking the trailer to the towing vehicle with the safety chain. Moreover, it is not believed that there are safety chains which securely lock the trailer to the vehicle while still functioning as a safety chain, permitting the trailer to be towed by the vehicle with the chain locked to both the trailer and vehicle. Finally, it is not heretofore known to provide a safety chain that can be securely locked to the towed vehicle by engaging the tongue of the towed vehicle for deterring theft of the chain and/or towed vehicle.

SUMMARY OF THE INVENTION

A safety chain or harness for securing a towed vehicle, such as a trailer, to a towing vehicle, such as a car or truck, for preventing the towed vehicle from becoming completely disengaged from the towing vehicle while being towed. The safety chain has a safety basket for limiting the downward movement of a tongue of the trailer for preventing the tongue from contacting the ground or pavement, should the tongue become unhitched from the towing vehicle during towing. To deter theft of the safety chain, the chain has a latch that can be locked in engagement with either the towing vehicle or the trailer. With the latch locked to the towing vehicle, theft of the trailer can preferably be deterred by a securing chain and locking chain which cooperate to engage the trailer tongue to prevent the tongue from disengaging from the chains.

The safety chain has a connector that is a flexible member, such as preferably a chain, that extends between the trailer and towing vehicle for preventing the trailer from becoming completely disengaged from the towing vehicle during towing of the trailer. Preferably, the safety chain includes a pair of spaced apart connecting chains, with each connecting chain extending from the trailer to the towing vehicle. Each connecting chain preferably has a latch for releasable engagement with either the trailer or preferably the towing vehicle.

The latch has a generally U-shaped shackle with a movable catch carried by the shackle for releasably engaging the shackle to close the mouth of the U-shaped shackle to prevent removal of the latch from a mount of the trailer or towing vehicle. To attach a latch to a connecting chain, the shackle has an eye at one end that is interconnected with a link of the connecting chain. To movably secure the catch to the shackle, the catch has a gate with a keeper sleeve that is slidably, telescopically received over the shackle adjacent its mounting eye. To releasably engage the catch with the shackle to latch the latch, the opposite end has a retainer sleeve that is at least partially telescopically received over the free end of the shackle and which can be biased toward its latched position by a spring between the keeper sleeve and the mounting eye of the shackle.

The catch is movable relative to the shackle between a latched position, where the gate is closed over the mouth of the shackle, and a position disposed from the latched position, exposing the mouth of the shackle and permitting the latch to be disengaged from its mount. To retain the catch in the latched position, the shackle and retainer sleeve each have a hole coaxially aligned with each other, when the catch is latched, for receiving a retainer. The retainer can be a pin for retaining the catch in the latched position. Preferably the retainer is a lock when it is desirable to securely lock the catch in the latched position to prevent removal of the latch and deter theft.

The safety basket has at least one tie beam, and preferably more than one tie beam, that extends underneath the trailer tongue from one of the connecting chins to the other of the connecting chins for limiting downward movement of the tongue relative to a hitch of the towing vehicle to prevent the tongue from contacting the pavement or ground, should the tongue become unhitched during towing. Preferably, each tie beam has one end connected or attached to one of the connecting chains and its other end connected or attached to the other of the connecting chains. Preferably, each end of each tie beam is curved to form a loop that is received through a link of the connecting chain to attach the tie beam to the connecting chain. If desired, each end of each tie beam may be welded directly to a connecting chain link.

The securing chain overlies the trailer tongue and extends from one of the connecting chains to the other of the connecting chains preferably for positioning the safety basket underneath the trailer tongue while also limiting how far down the connecting chains hang when slack. To deter theft of the trailer with the connecting chains locked to the towing vehicle, the securing chain is secured to each connecting chain and a locking chain is looped underneath the trailer tongue and preferably secured at both ends to the securing chain. Preferably, the locking chain and securing chain cooperate with the tongue to prevent withdrawal of the tongue free of the locking and securing chains to deter theft of the trailer, when the connecting chains are secured to the towing vehicle. Preferably, the locking chain and securing chain cooperate to constrict about the tongue to prevent withdrawal of the tongue free of the locking and securing chains to prevent theft of the trailer.

Objects, features and advantages of this invention are to provide a safety chain for a towed vehicle and a towing vehicle that minimizes and preferably prevents damage to a tongue of the towed vehicle, should the tongue become unhitched during towing; prevents the trailer from becoming unsafely and completely separated from its towing vehicle; can be quickly and easily fastened to the towed vehicle or towing vehicle using a latch of simple, reliable, and easy-to-use construction; utilizes a latch that can be locked to secure the safety chain to the towed vehicle or the towing vehicle to deter and preferably prevent theft of the chain; can be secured and locked to a tongue of the towed vehicle to deter theft of the chain and preferably also deter theft of the towed vehicle; preferably prevents disconnection of electrical connections between the trailer and towing vehicle; and is a safety chain that is simple, flexible, economical and reliable, and which is strong, rugged, easy to maneuver and install, is durable, is of economical manufacture and which is easy to use.

BRIEF DESCRIPTION OF THE DRAWINGS

These and other objects, features, and advantages of this invention will become apparent from the following detailed description of the best mode, appended claims, and accompanying drawings in which:

FIG. 1 is a perspective view of a tongue of a trailer connected to a hitch of a towing vehicle and secured by a safety chain of this invention having a safety basket for preventing the tongue from contacting the ground or pavement should the tongue become disengaged from the hitch of the towing vehicle;

FIG. 2 is an enlarged fragmentary view of the safety chain having a latch with a catch retained by a pin in a latched position;

FIG. 2A is an enlarged fragmentary view of that portion of the latch of FIG. 2 enclosed by the circle 2A illustrating the catch of the latch being secured in the latched position by a lock;

FIG. 3 is an enlarged perspective view of the latch with the catch being in an unlatched position;

FIG. 4 is an enlarged perspective view of the latch with the catch pivoted to an unlatched position;

FIG. 5 is an enlarged fragmentary perspective view of a tie beam of the safety basket welded to a link of the safety chain;

FIG. 6 is an enlarged fragmentary perspective view of the tie beam having one end wrapped around a link of the chain.

DETAILED DESCRIPTION OF THE INVENTION

Figure 7:
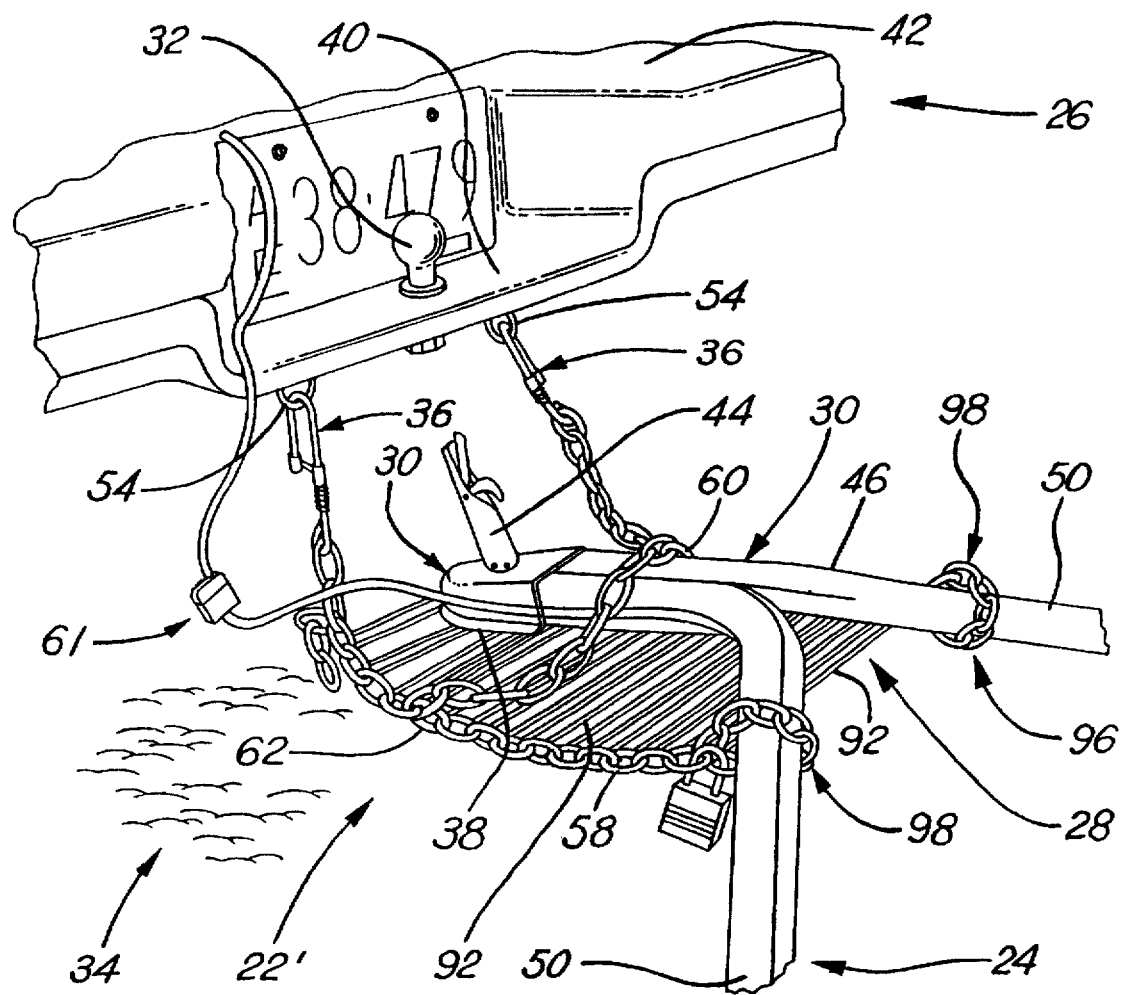
FIG. 7 is a perspective view of a second embodiment of the safety chain of this invention illustrating the safety basket limiting movement of the tongue of the trailer downwardly away from the hitch to prevent the tongue from contacting the ground or pavement.

FIG. 1 illustrates a safety harness arrangement 20 that is a safety chain 22 of this invention for securing a towed vehicle 24 to a towing vehicle 26. Preferably, the safety chain 22 has a safety basket 28 for limiting downward movement of a tongue 30 of the towed vehicle 24 relative to a mounting hitch 32 (FIG. 7) of the towing vehicle 26, should the tongue 30 become disengaged from the hitch 32, to prevent the tongue 30 from coming into contact with the ground or pavement 34 supporting the towed and towing vehicles 24 & 26. To enable the safety chain 22 to attach easily to either or both of the vehicles 24 and/or 26, the safety chain 22 has a latch 36. To deter theft of the safety chain 22, the latch 36 preferably can be locked when it is attached to the towed vehicle 24 or when it is attached to the towing vehicle 26. Preferably, to deter theft of the towed vehicle 24 when the safety chain 22 is locked to the towing vehicle 26, the safety chain 22 can also be easily secured and locked to the towed vehicle 24. The towed vehicle 24 can be a trailer.

As is depicted in FIG. 1, the tongue 30 of the trailer 24 has an outwardly flared skirt 38 that defines a complementary hollow (not shown) which functions as a receiver for locating and receiving the hitch 32 of the towing vehicle 26. As is shown more clearly in FIG. 7, the hitch 32 projects upwardly from a mounting platform 40 of a rear vehicle bumper 42 that preferably is integral with or mounted to a frame of the towing vehicle 26. To enable the tongue 30 to be releasably mounted to the hitch 32, the tongue 30 has a handle 44 which controls a hitch latching mechanism (not shown) of the tongue 30. As is shown in FIG. 1, with the tongue 30 received over the hitch 32 and the handle 44 down, the tongue 30 releasably engages the hitch 32 such that the trailer 24 can be towed by the towing vehicle 26. As is illustrated in FIG. 7, the tongue 30 can be disengaged and removed from the hitch 32 when the handle 44 is lifted toward its released or upward position.

The trailer 24 is depicted having a generally Y-shaped frame 46 with a pair of branches 48 & 50 of the frame 46 that converge to form the tongue 30. The safety chain 22 of this invention is also contemplated for use with trailers having frames of different sizes and configurations. Preferably, the skirt 38 of the tongue 30 is larger in cross sectional area than the cross sectional area of the frame 46 where the branches 48 & 50 of the frame 46 converge to form the tongue 30. Preferably, each branch of the trailer frame 46 has a hook 52, eye bolt, or another mechanism for mounting the safety chain 22 thereto. Alternatively, the safety chain 22 can simply be wrapped around each branch of the frame 46, such as is shown in FIG. 7, to attach the safety chain 22 to the trailer 24. To mount the safety chain 22 to the towing vehicle 26, the mounting platform 40 of the bumper 42 preferably has an eye bolt 54, mounting aperture, or mounting hook, for receiving the latch 36 of the chain 22. Other mounting mechanisms and mounting methods implemented on the towing vehicle 26 for enabling the safety chain 22 to be mounted to the towing vehicle 26 are also contemplated.

The safety chain 22 can also be attached to the towed vehicle by a bolt that extends through a link of the chain and is threadably received by the towed vehicle frame to anchor the bolt and chain 22 to the towed vehicle. If such a safety chain embodiment is preferred, the safety chain 22 can be a single chain that has a pair of branches that extend from a single anchoring bolt to each mount of the towing vehicle 26, with each branch of the safety chain 22 forming a connecting chain 56.

SAFETY CHAIN CONSTRUCTION

The safety chain 22 of this invention has a pair of connecting flexible members 56, that are preferably chains 56, attaching the trailer 24 to the towing vehicle 26. Preferably, each connecting chain 56 has one end attached to the trailer 24 and its other end attached to the towing vehicle 26 for safely securing the trailer 24 to the towing vehicle 26, should the trailer tongue 30 become unhitched from the towing vehicle 26. Additionally, if a single anchoring bolt is used to secure both connecting chains 56 to the trailer 24, each connecting chain 56 can be a branch of a common safety chain 22, with each connecting chain 56 extending from the anchoring bolt of the trailer 24 to each mount 54 of the towing vehicle 26. Although chain is preferred for use as each connecting chain 56, each connecting chain 56 could be a cable, a belt, a line, or another preferably flexible member, for attaching the trailer 24 to the towing vehicle 26 in a safety chain arrangement of this invention.

As is shown in FIGS. 1 & 7, each connecting chain 56 preferably has a plurality of links 58 that are connected to form a flexible member 56 of sufficient length so as to at least extend from the trailer 24 to the towing vehicle 26. Preferably, each chain 56 is sufficiently long so as to have some slack when the safety chain 22 is attached to the trailer 24 and towing vehicle 26 for securing the trailer 24 to the towing vehicle 26 while allowing the trailer 24 and towing vehicle 26 to freely turn during towing without hampering trailer and vehicle turning ability.

To enable each connecting chain 56 to be easily attached preferably to the towing vehicle 26, the latch 36 is secured to a chain link 58 at an end of the chain 56 adjacent the towing vehicle 26. Although the safety chain 22 shown in FIG. 1 only has a latch 36 attaching each connecting chain 56 to the towing vehicle 26, if desired, each connecting chain 56 can have a latch 36 at each end for enabling easy attachment of each connecting chain 56 to the trailer 24 and towing vehicle 26. If desired, each connecting chain 56 can have a latch 36 attaching that chain to the trailer 24 with each connecting chain 56 being attached to the towing vehicle 26 by another mechanism or method. Preferably, however, each connecting chain 56 of the safety chain 22 of this invention has one latch 36 which is used to attach that chain 56 preferably to the towing vehicle 26.

To limit the downward movement of the trailer tongue 30 relative to the towing vehicle mounting hitch 32, the safety basket 28 of the safety chain 22 extends from one of the connecting chains 56 to the other of the connecting chains 56. To prevent the safety basket 28 from hanging too far downwardly from the trailer tongue 30, the safety chain 22 has a securing chain 60 that extends from one of the connecting chains 56 to the other of the connecting chains 56 and has at least a portion of the securing chain 60 overlying the trailer tongue 30. Preferably, the securing chain 60 advantageously restricts lateral movement of the trailer tongue 30, should it become unhitched from the towing vehicle 26, to (1) keep the unhitched tongue 30 located on the safety basket 28 and to (2) limit or restrain how far the unhitched tongue 30 can move from side-to-side. By restraining lateral movement, the securing chain 60 and safety basket 28 cooperate to reduce the chance that any electrical connection 61 (FIG. 7) between the trailer 24 and towing vehicle 26 will be broken should the trailer 24 should become unhitched. To prevent damaging paint on the trailer tongue, the securing chain 60 can be encased in a protective sheath, such as a sheath of plastic or rubber or another durable, protective material.

To enable the safety chain 22 to be harnessed to the trailer 24 and towing vehicle 26, the securing chain 60 can have one end that can be detachable, if desired, to facilitate hook-up of the chain 22 to the trailer 24. Preferably, one end of the securing chain 60 is secured to one of the connecting chains 56 and the other end of the securing chain 60 is attached to the other of the connecting chains 56. Preferably, each end of the securing chain 60 is secured to its connecting chain 56, by a lock, a link that can be locked, a permanently fused link, or another securing mechanism, so the securing chain 60 cannot be easily removed.

If desired, the securing chain 60 can be removably attached to the connecting chain 56 using a connecting link, such as the connecting link 62 depicted in FIG. 7. Such a connecting link 62 preferably has a snap on the link 62 which can be moved or removed to expose a gap in the link 62 to enable the link 62 to be disengaged from the connecting chain 56.

LATCH CONSTRUCTION

Referring additionally to FIGS. 2–4, each latch 36 has a generally U-shaped shackle 64 that is carried by a connecting chain 56. Preferably, the shackle 64 is an elongate rod 66 that is curved and which has a mounting eye 68 at one end that is connected to a link 58 of the connecting chain 56 for attaching the latch 36 to the chain 56.

To retain the shackle 64 on the eye bolt mount 54 of the towing vehicle 26 and prevent removal of the shackle 64 from the eye bolt 54, the latch 36 has a catch 70 carried by the shackle 64. As is shown in FIGS. 2–4, the catch 70 is movable (1) from a latched position (FIG. 2), for enabling the latch 36 to be securely mounted to the towing vehicle 26, (2) to a position disposed from its latched position (FIG. 4), for enabling the latch 36 to be unlatched and removed from the towing vehicle 26. Preferably, to release the latch 36, the catch 70 is withdrawn from an end 72 of the shackle rod 66, such as is shown in FIG. 3, and pivoted or swung away from the shackle end 72, such as is shown in FIG. 4.

Preferably, the catch 70 includes a gate 74, that preferably is a shaft, with a keeper sleeve 76 at one end of the gate shaft 74 that is pivotally and movably received on the shackle rod 66 adjacent its mounting eye 68 where the shackle 64 is attached to a connecting chain 56. As is shown in FIG. 2, the keeper sleeve 76 preferably is hollow and is telescopically received over the shackle rod 66 until it is positioned adjacent the latch mounting eye 68. Preferably, the keeper sleeve 76 can be generally cylindrical and hollow to telescopically fit over a shackle rod 66 that is circular in cross section.

At its other end, the gate shaft 74 of the catch 70 preferably has a retainer sleeve 78 that operably engages the shackle 64. Preferably, the retainer sleeve 78 has a hollow portion for enabling it to be telescopically received over the end 72 of the shackle rod 66. Preferably, the retainer sleeve 78 can be generally cylindrical and hollow for being at least partially telescopically received over the end 72 of the shackle rod 66. Alternatively, if desired, the retainer sleeve 78 can be a cap having a hollow recess that is preferably complementary with the end 72 of the shackle 64 for receiving the shackle end 72.

Preferably, both the keeper sleeve 76 and retainer sleeve 78 are immovably affixed to the gate shaft 74 of the catch 70. Preferably, the sleeves 76 & 78 are securely attached to the gate shaft 74 such as preferably by welding. If desired, the sleeves 76 & 78 can also be attached to the shaft 74 by fasteners, threaded engagement, by an adhesive, or another mechanism or method of attachment.

To urge the catch 70 toward the latched position when the catch 70 is located in a position disposed away from the latched position and to releasably retain the catch 70 in the latched position when the latch 36 is latched, the latch 36 preferably can have a spring 80 between the keeper sleeve 76 and shackle mounting eye 68 that biases the catch 70 toward the latched position. Preferably, the spring 80 is a coil spring that is coaxially telescopically carried on the shackle rod 66 between the shackle mounting eye 68 and the keeper sleeve 76 of the catch 70. The latch 36 can be constructed without a biasing spring 80, if desired.

To retain the catch 70 in its latched position, the latch 36 preferably has a retainer 82 that operably engages the catch 70 and the shackle 64. Preferably, to releasably retain the catch 70 in its latched position, the retainer 82 is a pin 84, such as the pin 84 shown in FIG. 2, that extends through a bore 86 in the retainer sleeve 78 and a bore 88 through the shackle rod 66 (FIGS. 3 & 4) for preventing the sleeve 78 from being moved relative to the end 72 of the shackle rod 66. To securely lock the catch 70 in the latched position, the retainer 82 preferably is a locking device 90, such as for example the lock 90 shown in FIG. 2A.

When the retainer 82 is removed, the latch 36 can be unlatched by withdrawing the retainer sleeve 78 away from the end 72 of the shackle rod 66, generally in the manner shown in FIG. 3, and thereafter preferably by swinging the catch 70 away from the shackle rod 66, as is depicted in FIG. 4. To latch the latch 36, the catch 70 is positioned relative to the shackle 64 such that its retainer sleeve 78 is preferably substantially coaxial with the end 72 of the shackle rod 66. The catch 70 is then received over the shackle rod end 72 until the retainer bores 86 & 88 are substantially coaxially aligned. To maintain the catch 70 in the latched position and prevent it from moving away from the latched position, a retainer 82 is inserted through the bores 86 & 88, such as is shown in FIGS. 2 & 2A.

SAFETY BASKET CONSTRUCTION

The safety basket 28 is carried by the connecting chains 56 and lies under the trailer tongue 30, when the safety chain 22 is harnessed, for limiting downward movement of the tongue 30 relative to the mounting hitch 32, should the tongue 30 become disengaged from the hitch 32. The safety basket 28 is preferably attached to both of the connecting chains 56, as is illustrated in FIG. 2. The safety basket 28 has at least one tie beam 92 and preferably at least two tie beams 92 that extend from one connecting chain 56 to the other connecting chain 56 for enabling the safety basket 28 to catch and carry the trailer tongue 30 should the tongue 30 become unhitched during towing. Preferably, the safety basket 28 is composed of a plurality of tie beams 92 that extend from one connecting chain 56 to the other connecting chain 56.

As is shown more clearly in FIGS. 5 & 6, each tie beam 92 is preferably attached at one end to a link 58 of one of the connecting chains 56 and attached at its other end to a link 58 of the other of the connecting chains 56. As is shown in FIG. 1, the safety chain 22 can be constructed with a tie beam 92 adjacent the hitch 32 for supporting the trailer tongue 30 very close to the hitch 32, should the tongue 30 become unhitched. As is shown in FIG. 5, each end 94 of a tie beam 92 can be affixed directly to a link 58 of the connecting chain 56, such as by welding. Preferably, however, as is shown in FIG. 6, each end 94' of each tie beam 92 is curved to form a loop 96 that substantially encircles a link 58 of a connecting chain 56 to attach each tie beam 92 to the connecting chains 56. To secure each tie beam 92 to its connecting chain 56, each loop 96 is preferably welded. Preferably, the end of each loop 96 is welded to its tie beam 92 so that the loop 96 is closed thereby completely enclosing a link 58 of the connecting chain 56 for securely mounting each tie beam 92 at each end to the connecting chains 56, securely preventing removal therefrom while supporting an unhitched trailer tongue 30.

Should the trailer tongue 30 have a downwardly extending support post or support wheel, such as can be found on some camper trailers and the like, a safety chain of this invention can be constructed to be adjustable to enable the amount of slack in the chains 56 to be reduced so that the tie beams 92 of the safety basket 28 can be brought closer to the tongue 30 to further limit downward travel of the tongue 30, should it become unhitched, such that the support post will not contact the pavement or pound 34 underneath. To provide adjustability, the connecting chain 56 are preferably adjustable in length.

If desired the tie beams 92 can be of a downturned U-shaped construction (not depicted), having one downturned leg attached to one of the connecting chains 56, another downturned leg attached to the other of the connecting chains 56, and a horizontal tie beam portion extending substantially horizontally between the legs and underneath the trailer tongue 30 to sufficiently limit downward movement of an unhitched tongue 30 such that its support post will not contact the ground or pavement 34. Preferably, the length of each leg determines how close the horizontal beam portion of the each tie beam is located to the trailer tongue 30. In this manner, the tie beams can be positioned immediately underneath the tongue 30 to significantly limit and preferably minimize downward travel of the tongue 30, should the tongue 30 become unhitched from the towing vehicle 26.

Preferably, the safety chain 22 or 22' of this invention can be made with varying distances between the tie beams 92 and trailer tongue 30 for various trailer configurations to appropriately and safely limit the downward travel of the tongue 30 for a specific trailer configuration, should the tongue 30 become unhitched during towing. If desired, the safety chain 22 or 22' of this invention can be constructed with tie beams 92 that are adjustable to suitably vary and lessen the distance between the trailer tongue 30 and each tie beam 92 to appropriately and safely limit the downward travel of the trailer tongue 30 for trailers of different sizes and varying configurations.

THEFT DETERRENT CONSTRUCTION

To prevent theft of the safety chain 22, each latch 36 can be secured in its latched position by a lock 90, such as in the manner shown in FIG. 2A. Preferably, to deter theft of the safety chain 22, the latch 36 is attached to a mount of either the trailer 24 or the towing vehicle 26 that will not allow the latch 36 to slip free of the mount when the latch 36 is engaged with the mount and locked in its latched position. The eye bolt 54 of the towing vehicle is only one example of such a mount.

Preferably, each latch 36 can be securely locked when engaged with and latched to an eye bolt 54 of the towing vehicle 26 to deter theft of the safety chain 22. Alternatively, to deter safety chain theft, each latch 36 can be latched to a mount of the trailer 24 and locked, so long as the mount of the trailer 24 does not permit disengagement of the latch 36 while the latch 36 is locked in its latched position. Alternatively, if the frame 46 of the trailer 24 is tubular, such as is depicted in FIGS. 1 & 7, and the mouth of the shackle 64 sufficiently large so as to enable the shackle 64 to encircle the trailer frame 46, a latch 36 can be placed over each branch 48 & 50 of the frame 46 and locked in its latched position to deter theft of the chain 22. However, if desired, an end 98 of each connecting chain 56 can be looped around a branch of the trailer frame 46 in the manner shown in FIG. 7. If looped around each branch of the trailer frame 46, the loop 98 of each connecting chain 56 is preferably locked to prevent removal from the trailer 24. For example, locking links or locks may be used to secure each connecting chain 56 around each branch of the trailer frame 46.

To deter theft of the trailer 24, the safety chain 22 preferably can be secured to both the towing vehicle 26 and the trailer 24. To secure the safety chain 22 to the trailer 24, a locking chain 100 is preferably carried by the securing chain 60, such as is shown in FIG. 1, for cooperating with the securing chain 60 to encircle and secure the safety chain 22 to the trailer tongue 30. Preferably, the locking chain 100 is (1) secured by a lock or another securing device to the securing chain 60 adjacent the trailer tongue 30, (2) is looped underneath the tongue 30, and (3) is secured to the securing chain 60 adjacent the tongue 30 such as by another lock.

Preferably, the locking chain 100 and securing chain 60 cooperate to wrap around the trailer tongue 30 to prevent the tongue 30 from being withdrawn free of the chains 60 & 100. Preferably, the chains 60 & 100 cooperate to tightly constrict about the tongue 30 to prevent withdrawal of the tongue 30 free of the safety chain 22. Preferably, the chains 60 & 100 cooperate to constrict about the tongue 30 and bear against the outwardly flared skirt 38 of the tongue 30 to prevent withdrawal of the tongue 30 free of the chains 60 & 100. Preferably, the useful length of the locking chain 100 and/or securing chain 60 is adjustable to accommodate trailer tongues 30 and/or frames 46 of different cross sectional areas, shapes, and sizes. To deter theft of the trailer 24 when the tongue 30 is secured, the safety chain 22 is preferably locked to the towing vehicle 26, such as preferably using latches 36 that are locked in the latched position in the manner depicted in FIG. 2A.

If a locking chain is not used, the latches 36 can be locked to the towing vehicle 26 and the connecting chains 56 looped around and locked to the trailer 24, such as is depicted by the safety chain embodiment 22' shown in FIG. 7. In another embodiment the safety chain 22 of this invention can have a latch 36 at each end of each connecting chain 56 that is respectively locked to the towing vehicle 26 and locked to the trailer 24 for deterring theft of the trailer 24.

Preferably, the components of the safety chain 22 of this invention are constructed of a durable and resilient metal, such as steel, a steel alloy, stainless steel, titanium, titanium alloy, a high-strength low alloy steel, aluminum, an aluminum alloy or another suitable metal. If it is desirable to construct the safety chain 22 with improved corrosion resistance, all, some or various components of the safety chain 22 can be constructed of a stainless steel. If desired, all, some or various components of the safety chain 22 can be constructed of a composite material, such as, for example, carbon fiber or a glass filled nylon.

USE AND OPERATION

In use, the safety chain 22 of this invention is used to secure a towed vehicle 24 to a towing vehicle 26, should the towed vehicle 24 become unhitched from the towing vehicle 26. Preferably, the safety chain 22 can be used with a towed vehicle 24 that is a trailer, such as a boat trailer, a flatbed trailer, a horse trailer, a camper trailer, another type of trailer which can be attached to a towing vehicle, or a towing bar. Alternatively, the safety chain 22 can be used with another towed vehicle 24 that uses a hitch to connect the towed vehicle 24 to a towing vehicle 26. Preferably, the towing vehicle 25 is an automotive vehicle, such as an automobile or a truck.

Although the trailer tongue 30 is shown in FIGS. 1 & 7 having a handle 44 to enable engagement of the tongue 30 with the hitch 32 and disengagement and removal of the tongue 30 from the hitch 32, another type of latching mechanism can be used such as, for example, a rotating latching mechanism where a threaded nut is rotated on the tongue 30 to secure or release the tongue 30 from the hitch 32. It is also contemplated that the safety chain 22 of this invention can be used with another type of ball hitch and latching mechanism, a loop hitch, such as is disclosed in U.S. Pat. No. 4,180,281, or another type of hitch for attaching a towed vehicle 24 to a towing vehicle 26.

In harnessing the safety chain 22 to the vehicles 24 & 26, for the safety chain 22 shown in FIG. 1, the latches 36 of each connecting chain 56 are attached to mounts 54 of the towing vehicle 26, that can be eye bolts 54, and the opposite end of the connecting chains 56 are attached to mounts 52 on the trailer frame 46 that can be hooks 52. The safety chain 22 is oriented such that the safety basket 28 is underneath the trailer tongue 30 and the securing chain 60 overlies the tongue 30. In harnessing the safety chain 22 to the trailer 24 and towing vehicle 26, the detachable end of the securing chain 60 is attached and preferably locked to its connecting chain 56.

To secure the safety chain 22 to the trailer 24, the locking chain 100 is wrapped underneath and around the trailer tongue 30 a distance from the tongue skirt 38 such that it cooperates with the securing chain 60 to constrict about the trailer tongue 30. Preferably, both ends of the locking chain 100 are securely attached to the securing chain 60, such as by locks or the like. To secure the safety chain 22 to the towing vehicle 26, each latch 36 is preferably locked after it is attached to a mount 54 of the towing vehicle 26.

In operation, the safety chain 22 extends from the trailer 24 to the towing vehicle 26 and becomes functional if the trailer tongue 30 becomes unhitched during towing. As is shown in FIG. 7, should the tongue 30 become unhitched, the connecting chains 56 serve to keep the trailer 24 connected to the towing vehicle 26 to prevent the trailer 24 from unsafely freeing itself from the towing vehicle 26. Should, the tongue 30 become unhitched during towing, it falls downwardly onto the safety basket 28, which limits and preferably prevents further downward movement of the tongue 30 toward the pavement or ground 34 thereby preventing the tongue 30 from contacting the pavement or ground 34.

Theft of the safety chain 22 is preferably deterred because the latches 36 of the connecting chains 56 are locked to the towing vehicle 26. Preferably, theft of the trailer 24 is deterred with the connecting chains 56 secured to the towing vehicle 26 because the locking chain 100 and securing chain 60 cooperate to constrict about the trailer tongue 30 to prevent the tongue skin 38 from being pulled free of the chains 60 & 100.

To remove the Safety chain 22, the connecting chains 56 are detached from the trailer 24 and towing vehicle 26 and the locking and securing chains 60 & 100 are unlocked. To detach the connecting chains 56 from the towing vehicle 26, the latches 36 are unlocked, the catch 70 of each latch 36 is pulled away from the end 72 of the shackle rod 66, and thereafter the catch 70 is rotated away from the shackle rod end 72. To detach the connecting chains 56 from the trailer 24, each chain 56 is simply disengaged from the trailer hook 52. To enable the safety chain 22 to be completely removed, the detachable end of the securing chain 60 is unlocked and detached from its connecting chain 56 and at least one end of the locking chain 100 is unlocked and detached from the securing chain 60. Thereafter, the safety chain 22 can be removed free of both the trailer 24 and towing vehicle 26.

It is also to be understood that, although the foregoing description and drawings describe and illustrate in detail working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A safety harness in combination with a towing vehicle and a towed vehicle comprising:
   a) said towing vehicle having a hitch;
   b) said towed vehicle having 1) a tongue releasably engaged to said towing vehicle hitch and 2) possessing a towed vehicle frame portion extending outwardly from said tongue and rearwardly of said hitch;
   c) a pair of spaced apart connectors with each said connector comprising a flexible connecting member having one end attached to said towed vehicle and another end attached to said towing vehicle; and
   d) a safety basket having at least one elongate tie beam connecting one of said flexible connecting members to the other of said flexible connecting members with said tie beam being constructed and arranged to space one of said flexible connecting members from the other of said flexible connecting members and said tie beam having a portion underlying said frame portion of said tongue adjacent said hitch when said tongue is releasably engaged to said hitch for supporting said tongue or said frame portion of said tongue should said tongue become disengaged from said hitch to limit movement of said tongue relative to and downwardly away from said hitch.

2. The combination of claim 1 wherein (1) said towing vehicle has a rear bumper, and (2) each said flexible connecting member comprises a connecting chain extending directly from said towing vehicle bumper directly to said towed vehicle.

3. The combination of claim 2 wherein said towed vehicle is disposed behind said towing vehicle and said safety basket comprises at least two tie beams spaced apart from each other in a direction rearwardly of said hitch with each said tie beam connecting said chains and said tie beams constructed and arranged (1) to space said connecting chains apart from each other and (2) to space said connecting chains away from said tongue, frame and hitch.

4. The combination of claim 2 further comprising a latch attached to each chain for releasably securing each chain to one said towed vehicle and said towing vehicle.

5. The combination of claim 4 wherein said latch comprises:
   a) a shackle for engagement with one of said towed vehicle and said towing vehicle, said shackle comprising an elongate, curved and U-shaped rod forming a hook having 1) a free end for insertion into a mounting opening in one of said towed vehicle and said towing vehicle and 2) a mounting eye at another end for attachment to said chain; and
   b) a catch carried by said shackle rod and movable between 1) a latched position for preventing disengagement of said shackle from one of said towing vehicle and said towed vehicle when said shackle rod has been inserted into an opening in one of said towed vehicle and towing vehicle, and 2) a position disposed from said latched position for permitting disengagement and removal of said shackle from one of said towed vehicle and said towing vehicle.

6. The combination of claim 5 wherein said catch is biased by a spring toward said latched position.

7. The combination of claim 5 wherein said latch further comprises a retainer for preventing said catch from being moved away from said latched position.

8. The combination of claim 5 wherein said catch comprises a shaft having (1) a hollow sleeve at one end that is (i) pivotally and telescopically received over said shackle rod, (ii) located adjacent said mounting eye, and (iii) which can be moved along said shackle rod, (2) a cap at its other end having a complementary recess for receiving the free end of the shackle rod to capture said shackle rod end therein, with said catch movable (i) from a latched position where said shackle rod end is captured by said cap (ii) toward an unlatched position where said cap is disposed from said shackle rod end, and (3) a coil spring telescoped over said shackle rod and disposed between said sleeve and said mounting eye for urging said catch toward said latched position.

9. The combination of claim 8 further comprising (1) a through bore in said cap and said shackle rod end wherein said through bores are generally coaxial when said cap is received over said shackle rod end and (2) a pin inserted through said bores to retain said cap over said shackle rod end.

10. The combination of claim 9 wherein said cap is a hollow sleeve constructed and arranged to telescopically receive said free end of said shackle rod.

11. The combination of claim 2 wherein each said connecting chain has 1) a first connecting point adjacent one end operably connected to said towing vehicle, 2) a second connecting point adjacent its other end operably connected to said towed vehicle, and 3) extends between said connecting points continuously from said towing vehicle to said towed vehicle without contacting said hitch or tongue adjacent said hitch.

12. The combination of claim 2 wherein (1) one of said connecting chains is disposed on one side of said tongue and the other of said connecting chains is disposed on the other side of said tongue, (2) with said tie beam underlying and extending outwardly of said frame having one end attached to one of said connecting chains and the other end attached to the other of said connecting chains, and (3) said tie beam being of substantially rigid construction.

13. The combination of claim 1 wherein said towed vehicle and towing vehicle are supported on the ground and said tie beam has a generally straight and horizontal portion underlying said tongue or said frame of said towed vehicle for catching said tongue or frame should said tongue become disengaged from said hitch to limit downward movement of said tongue of said towed vehicle toward the ground for preventing said tongue or any portion of said frame from coming into contact with the ground.

14. The combination of claim 1 wherein said safety basket comprises at least two said tie beams with each said tie beam having one end operably connected to one of said connecting chains and the other end of each said tie beam operably connected to the other of said connecting chains.

15. The combination of claim 1 wherein said safety basket comprises a plurality of generally straight and substantially rigid tie beams each having one end attached to one of said flexible connecting members and their other end attached to the other of said flexible connecting members with said tie beams being spaced apart in a direction rearwardly of said hitch.

16. A safety chain in combination with a trailer and a towing vehicle comprising:
  a) said towing vehicle having a hitch;
  b) said trailer having a tongue for releasable engagement with said hitch;
  c) a pair of connecting chains with each chain attached to said trailer and said towing vehicle for securing said trailer to said towing vehicle; and
  d) a latch carried by each said connecting chain for releasably connecting each of said chains to one of said trailer and said towing vehicle, said latch comprising 1) a shackle for engagement with one of said trailer and said towing vehicle; and 2) a catch carried by said shackle that is movable between I) a latched position for preventing disengagement of said shackle from one of said towing vehicle and said trailer, and ii) a position disposed from said latched position for permitting disengagement of said shackle from one of said trailer and said towing vehicle,
  wherein a) said shackle comprises an elongate, curved and U-shaped rod forming a hook having (1) a free end for insertion into a mounting opening in one of said towed vehicle and said towing vehicle and (2) a mounting eye at the other end for attachment to Said chain, and b) said catch comprises a shaft having (1) a hollow sleeve at one end that is (I) pivotally and telescopically received over said shackle rod, (ii) located adjacent said mounting eye, and (iii) which can be moved along said shackle rod, (2) a cap at its other end having a complementary recess for receiving the free end of the shackle rod to capture said shackle rod end therein, with said catch being movable (I) from a latched position where said shackle rod end is captured by said cap (ii) toward an unlatched position where said cap is disposed from said shackle rod end, and (3) a coil spring telescoped over said shackle rod and disposed between said sleeve and said mounting eye for urging said catch toward said latched position.

17. The safety chain of claim 16 wherein said latch further comprises a retainer that is a lock for preventing said catch from being moved away from said latched position.

18. The combination of claim 16 wherein each said chain has a portion extending lower than said hitch providing slack and further comprising at least two substantially rigid tie beams, each having an end connected to one of said chains and their other end connected to the other of said chains and having a portion that is straight and generally horizontal that lies below said tongue rearwardly of said hitch.

19. A safety chain in combination with a trailer and a towing vehicle comprising:
  a) said towing vehicle having a hitch;
  b) said trailer having a tongue engaged to said hitch;
  c) a first connecting chain securing said trailer to said towing vehicle;
  d) a second connecting chain securing said trailer to said towing vehicle;
  e) a latch attaching said first and second .connecting chains to one of said towing vehicle and said trailer, said latch having a generally U-shaped shackle for releasable engagement with one of said vehicle and said trailer and a catch carried by said shackle that is movable between 1) a latched position for preventing disengagement of said shackle, and 2) a position disposed from said latched position permitting disengagement of said shackle; and
  f) a safety basket carried by said first and second connecting chains having a substantially rigid elongate tie beam connecting said first connecting chain to said second connecting chain with at least a portion of said tie beam being generally straight, horizontal and disposed lower than said tongue and rearwardly of said hitch for limiting movement of said tongue downwardly away from said hitch should said tongue become free of said hitch.

20. A safety harness in combination with a towed vehicle and a towing vehicle comprising:
  a) said towing vehicle having a hitch;
  b) said towed vehicle disposed behind said towing vehicle and having 1) a tongue for engagement to said hitch, and 2) a frame carrying said tongue extending from said tongue;
  c) a pair of generally flexible connecting members connecting said towed vehicle to said towing vehicle with 1) one of said connecting members attached to said towing vehicle disposed to one side of said hitch and attached to said towed vehicle disposed to said one side of said hitch and 2) the other of said connecting members attached to said towing vehicle disposed on the other side of said hitch and attached to said towed vehicle disposed on said other side of said hitch;
  d) an elongate and substantially rigid tie beam carried by said connecting members that is disposed directly underneath said tongue or said frame and rearwardly of said hitch for 1) limiting downward movement of said tongue relative to said hitch by catching said tongue or said frame should said tongue become free of said hitch and 2) spacing one of said connecting members from the other of said connecting members such that said one of said connecting members cannot contact the other of said connecting members; and
  e) wherein said connecting members are constructed and arranged to locate said tie beam directly underneath said tongue or said frame to ensure said tongue is caught by said tie beam should said tongue disengage from said hitch.

21. The combination of claim 20 wherein 1) each said connecting member is a chain, 2) said tie beam extends from one of said chains to the other of said chains, and 3) said tie beam has one end extending in one direction outwardly of said tongue and its other end extending outwardly in an opposite direction outwardly of said tongue.

22. The combination of claim 21 comprising at least two and no more than four spaced apart substantially rigid tie beams connecting one of said chains to the other of said chains with each said tie beam underlying said frame.

23. The combination of claim 21 wherein said tie beam spaces one of said chains from the other of said chains such that one of said chains is disposed outwardly of said tongue to one side of said hitch and the other of said chains is disposed outwardly of said tongue to the other side of said hitch.

* * * * *